No. 743,628. PATENTED NOV. 10, 1903.
G. L. ESTES.
SHAFT COUPLING.
APPLICATION FILED NOV. 13, 1902.
NO MODEL.

Witnesses
Walter B. Payne
G. Willard Rick

Inventor
George L. Estes,
By
Frederick S. Church
his Attorney

No. 743,628. Patented November 10, 1903.

UNITED STATES PATENT OFFICE.

GEORGE L. ESTES, OF ROCHESTER, NEW YORK.

SHAFT-COUPLING.

SPECIFICATION forming part of Letters Patent No. 743,628, dated November 10, 1903.

Application filed November 13, 1902. Serial No. 131,162. (No model.)

*To all whom it may concern:*

Be it known that I, GEORGE L. ESTES, of Rochester, in the county of Monroe and State of New York, have invented certain new and useful Improvements in Shaft-Couplings; and I do hereby declare the following to be a full, clear, and exact description of the same, reference being had to the accompanying drawings, forming a part of this specification, and to the reference-numerals marked thereon.

My present invention has for its object to provide an improved shaft-coupling by means of which adjoining ends of two sections of a shaft may be coupled together in perfect alinement and securely joined to prevent a twisting or turning of one section independently of the other, and my invention has for its further object to provide a frictional coupling in which the separate parts of the inner sleeve or bushing may be secured together and yet permitted a movement relatively to each other to facilitate the application of the sleeve to the shaft.

To these and other ends the invention consists in certain improvements in construction and combinations of parts, all as will be hereinafter more fully described, the novel features being pointed out in the claims at the end of the specification.

Figure 1:
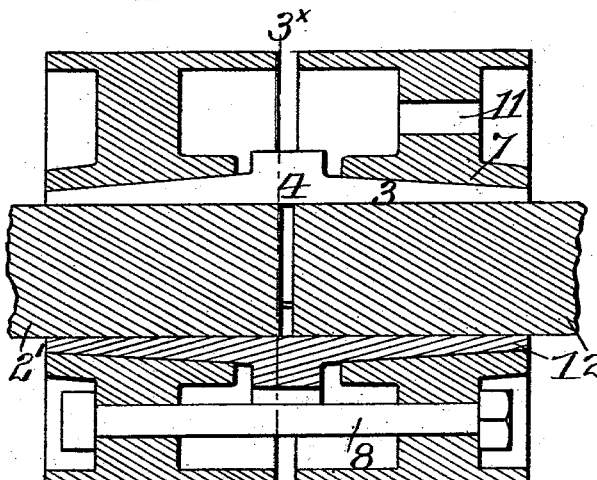
Figure 2:
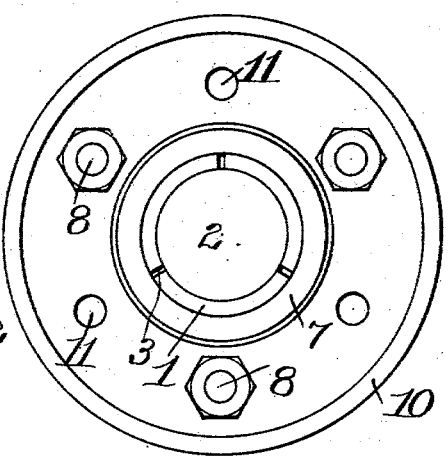
Figure 3:
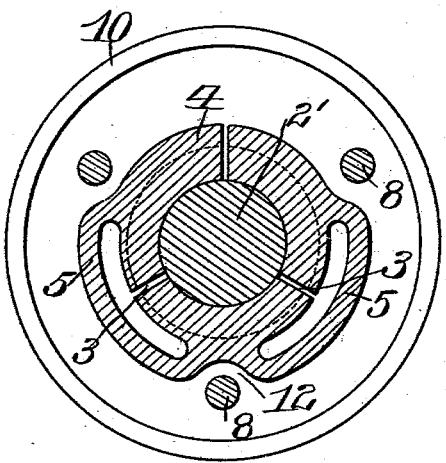
Figure 4:
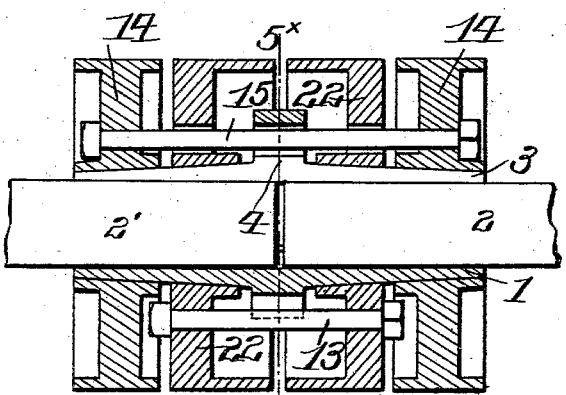
Figure 5:
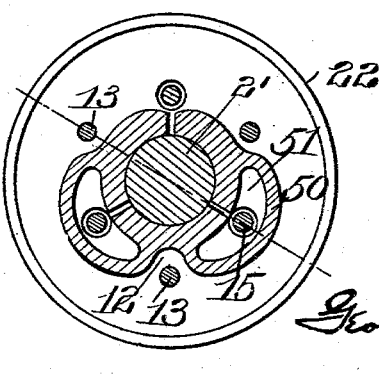

In the drawings, Figure 1 is a longitudinal sectional view of a shaft-coupling constructed in accordance with my invention. Fig. 2 is an end view thereof. Fig. 3 is a cross-sectional view on the line $3^\times 3^\times$ of Fig. 1. Fig. 4 is a view similar to Fig. 1, showing a modified form of coupling. Fig. 5 is a cross-sectional view taken on the line $5^\times 5^\times$ of Fig. 4.

Similar reference-numerals in the several figures indicate similar parts.

In the drawings I have shown the adjacent ends of two sections of a shaft and the coupling by means of which they are secured together, embodying generally a sleeve 1, surrounding the ends of shaft-sections 2 and 2' and provided with conical surfaces tapering from the center toward each end. In practice this sleeve is formed into a plurality of parts by means of longitudinally-extending slots or channels, (indicated by 3,) so that the various sections of the sleeve may be compressed tightly into contact with the surfaces of the shafts, as will be presently described.

At the central portion of the sleeve is formed an annular rib 4, adapted to overlap the proximate ends of the shaft-sections for the purpose of giving additional strength to the sleeve at that point when it is subjected to the greatest strain. The clamping-plates 6 are each arranged centrally upon a hub 7, the interior or bore of which is tapered upon an angle corresponding to the face or conical surface of the sleeve and which are adapted to be drawn toward each other, so as to compress the ends of the sleeves against the separate sections of the shaft. This is accomplished by means of the bolts 8, extending through suitable apertures in each of the clamping-plates 6, and the ends of the hubs 7, extending at opposite sides of the plates, form long engaging surfaces coöperating with the ends of the sleeve, causing them to grip the shafts tightly. The clamping-plates are each provided with annular rims 10, making the coupling in the form of a drum and permitting it to be used as a pulley, if desired. Also arranged in one of the plates 6 are apertures 11, through which a suitable instrument may be inserted into engagement with the other clamping-plate, so that it may be removed after the bolts 8 have been disengaged.

The several sections of the sleeve or bushing are supported in their relative positions by bands or arms 5, which extend between adjacent sections, and these bands or arms are usually formed integrally with the sleeve, and the latter is subdivided into a number of parts by the slots or channels 3, which are provided after the various operations of boring and turning the tapered ends on the sleeve. In the drawings I have shown the sleeve formed into three sections, which are connected by two of the arms or bands, and the latter being comparatively thin and elastic permit said sections to be opened outwardly slightly and also to yield at an angle to each other when being applied to a shaft, and, further, the elasticity in the arms serves to disengage the sections when the clamping-plates are removed, so that the sleeve or bushing may be readily removed from the shaft. In order to locate the bolts 8 as close to the shaft as possible, a depression (indicated by 12) is provided between the ends of the arms through which they pass.

In Fig. 4 I have shown a modified form of coupling, which is adapted particularly to be used upon large or extremely heavy shafting, the only departure from the structure before described being in providing a double arrangement of clamping-disks in which there are arranged outer disks 14, adapted to be drawn together by bolts 15, and inner or intermediate disks 22, between which extend clamping-bolts 13. This form of coupling may employ a bushing the same as that before described; but as it is necessary to employ a double set of clamping-bolts and also desirable to arrange them close to the shaft the connecting-arms 50 of the bushing are arranged to form the apertures 51, through which one of the sets of clamping-bolts may pass. It will be seen that by drawing up the inner and outer pairs of disks separately an increased compressional effect may be obtained upon the sleeve or bushing.

In the drawings I have illustrated the bushing as being composed of three parts; but it will be understood that it may be divided into any number of sections and that the arms or bands may extend continuously around the bushing, or only a sufficient number of the arms may be employed to secure the several sections in their relative positions, as shown.

The coupling which I have described and illustrated consists of few parts, and by connecting the separate sections of the sleeve by means of curved arms, which I arrange concentric therewith, I am enabled to provide a shaft-coupling that is very strong, and one in which the minimum amount of material may be used, thus reducing its weight and making the coupling compact.

I claim as my invention—

1. In a shaft-coupling, the combination with a sleeve having the exterior tapering surfaces at the ends and composed of a plurality of segments and a supporting-arm arranged exteriorly of said segments and yieldingly connecting them and arranged in proximity thereto, of clamping-plates located at opposite sides of the arm and extending beyond it and having apertures provided with conical surfaces adapted to engage the tapered ends of the sleeve and bolts extending through the plates.

2. In a shaft-coupling, the combination with a sleeve having the exterior tapering surfaces at the ends and composed of a plurality of segments and yielding supporting-arms connecting said segments at their outer sides whereby they may be moved radially and also at an angle to each other, of clamping-plates arranged at opposite sides of the arms and extending beyond them and provided with apertures having conical surfaces adapted to engage the tapered ends of the sleeve and bolts extending through the plates and exteriorly of the supporting-arms.

3. In a shaft-coupling, the combination with a sleeve having the tapering surfaces at the ends and composed of a plurality of segments and arms connecting them at their outer sides whereby they may yield relatively when they are moved to open the bushing, of clamping-plates having apertures provided with conical surfaces adapted to engage over the ends of the sleeve, there being annular flanges on the plates extending over the arms and bolts securing the plates.

4. In a shaft-coupling, the combination with a sleeve composed of a plurality of segments there being an annular rib on the sleeve and tapering surfaces on the latter arranged at each side of the rib, and an elastic arm connecting adjacent sections of the sleeve, of clamping-plates on the ends of the latter and bolts extending between them.

GEORGE L. ESTES.

Witnesses:
G. WILLARD RICH,
WALTER B. PAYNE.